United States Patent
Geng et al.

(10) Patent No.: US 10,061,228 B2
(45) Date of Patent: Aug. 28, 2018

(54) STOP TRANSMISSION MECHANISM AND TONER CARTRIDGE

(71) Applicant: CET Group Co., Ltd., Beijing (CN)

(72) Inventors: Haifeng Geng, Beijing (CN); Bo Chen, Beijing (CN)

(73) Assignee: CET Group Co., Ltd., Beijing (CN)

( * ) Notice: Subject to any disclaimer, the term of this patent is extended or adjusted under 35 U.S.C. 154(b) by 0 days.

(21) Appl. No.: 15/687,239

(22) Filed: Aug. 25, 2017

(65) Prior Publication Data

US 2017/0351197 A1  Dec. 7, 2017

(30) Foreign Application Priority Data

Jun. 20, 2017  (CN) .......................... 2017 1 0470058

(51) Int. Cl.
  *G03G 15/08*  (2006.01)
  *F16D 63/00*  (2006.01)
  *G03G 21/16*  (2006.01)

(52) U.S. Cl.
  CPC ....... *G03G 15/0889* (2013.01); *F16D 63/006* (2013.01); *G03G 15/087* (2013.01); *G03G 21/1647* (2013.01); *F16D 2200/0056* (2013.01); *G03G 2221/1657* (2013.01)

(58) Field of Classification Search
  CPC ..................................................... F16D 63/006
  See application file for complete search history.

(56) References Cited

U.S. PATENT DOCUMENTS

| | | | | |
|---|---|---|---|---|
| 2,137,643 A | * | 11/1938 | Cirac | F16D 41/12 105/130 |
| 4,437,356 A | * | 3/1984 | Imazaike | F16H 55/06 74/411 |

* cited by examiner

*Primary Examiner* — Clayton E Laballe
*Assistant Examiner* — Jas Sanghera

(57) ABSTRACT

A stop transmission mechanism includes: a ratchet, wherein elastic teeth are provided on a periphery of the ratchet; a claw provided at a radical side of the ratchet, comprising a fixed end and a moving end which rotates around the fixed end, wherein a claw portion to be engaged with the elastic teeth is provided on the moving end; and a tension spring, wherein one end of the tension spring is fixed, and the other end of the tension spring is mounted on the moving end of the claw, for providing a force which drives the claw portion towards the ratchet; wherein the elastic teeth are made of an elastic material; when the claw portion of the claw is buckled on the elastic teeth by the force of the tension spring, the ratchet is flexibly fixed; when external driving force is large enough, sliding tooth happens.

8 Claims, 15 Drawing Sheets

STOP TRANSMISSION MECHANISM AND TONER CARTRIDGE

CROSS REFERENCE OF RELATED APPLICATION

The present invention claims priority under 35 U.S.C. 119(a-d) to CN 201710470058.6, filed Jun. 20, 2017.

BACKGROUND OF THE PRESENT INVENTION

Field of Invention

The present invention relates to a technical field of a toner cartridge for feeding toner to an imaging device such as a printer, and more particularly to a stop transmission mechanism and a toner cartridge.

Description of Related Arts

A developing device for developing an electrostatic latent image formed on a photosensitive drum is provided in all electronic imaging equipment such as a copying machine or an integrated printer, wherein the developing device coats the electrostatic latent image with toner for developing, and the toner consumed during developing is supplied by a toner cartridge. Usually, according to the conventional electronic imaging equipment, during installation of the toner cartridge, two fixing steps are needed, respectively called external fixing and internal fixing. External fixing is an artificial process, wherein the toner cartridge is inserted into a toner cartridge slot of the electronic imaging equipment, and is fixed in the toner cartridge slot through a buckle at one end of the toner cartridge. Internal fixing is driven by internal gears of the electronic imaging equipment, so as to rotate the toner cartridge into a working position.

Chinese patent ZL200720056217.X discloses a toner container, comprising an inner cylinder for containing toner, which is provided with an inner cylinder toner outlet provided on an internal wall; an outer cylinder with an outer cylinder toner outlet provided thereon, wherein an outer cylinder end cap is provided at one end of the outer cylinder; and a stirring frame provided inside the inner cylinder for stirring toner, wherein a gear for receiving power is provided on an end of the stirring frame and is located at the outer cylinder end cap. A stop transmission mechanism comprises: a rotation restrictor for selectively restricting rotation of the gear; a slider having a slider slot, wherein one end of the slider is connected to the rotation restrictor; and a restriction boss placed in the slider slot.

Working principles of the stop transmission mechanism of the toner cartridge are as follows: the restriction boss is initially located in the slider chute near an end having a pull pin; because the outer cylinder rotates relative to the inner cylinder, the slider with the outer cylinder moves relative to the restriction boss, and the restriction boss moves from the end having the pull pin to an end without the pull pin; as the outer cylinder continues to rotate, the slider slot of the slider is stuck on the restriction boss and cannot be moved with the outer cylinder; meanwhile, due to the pull pin connected to the rotation restrictor, the rotation restrictor is lifted by the pull pin and is detached from a bevel of a stirring frame gear, thereby unlocking the stirring frame gear; therefore, carrier gear is engaged with the stirring frame gear for beginning working. When the toner is used up, the gears rotate along an original rotating direction, in such a manner that the outer cylinder returns to an initial position, and then the toner cartridge is removed from a developer unit of the imaging equipment for replacement.

The above-mentioned mechanism has the following problems:

First, the mechanism comprises the rotation restrictor, a tension spring, the pull pin, and the slider, wherein the slider needs to set the slider slot to cooperate with the restriction boss; both ends of the pull pin need to be respectively fixed in small holes of the slider and the rotation restrictor, and the stop transmission mechanism and the carrier gear are both located in a front end of the toner cartridge. Therefore, the mechanism not only has a complex structure, but also has high requirements on the precision of part processing and installation; furthermore, its maintenance costs are high.

Second, the mechanism controls the rotation restrictor to lock or unlock the stirring frame gear through the restriction boss and the slider; when the restriction boss moves relative to the slider, there is friction between the restriction boss and the slider slot; the slider must be parallel and level to the outer cylinder end cap for smoothly sliding; if an inner edge of the slider slot slightly unfits the restriction boss, or an applying point of the pull pin on the slider is shifted, the slider is easy to be stuck; as a result, the stirring frame gear is hard to be driven and the driving mechanism of the image imaging equipment will be damaged.

SUMMARY OF THE PRESENT INVENTION

An object of the present invention is to provide a stop transmission mechanism and a toner cartridge, so as to solve problems of conventional toner cartridges such as complex structure of stop transmission mechanism, as well as inconvenient installation and maintenance.

Accordingly, in order to accomplish the above objects, the present invention provides a stop transmission mechanism, comprising:

a ratchet, wherein elastic teeth are provided on a periphery of the ratchet;

a claw provided at a radical side of the ratchet, comprising a fixed end and a moving end which rotates around the fixed end, wherein a claw portion to be engaged with the elastic teeth is provided on the moving end; and a tension spring, wherein one end of the tension spring is fixed, and the other end of the tension spring is mounted on the moving end of the claw, for providing a force which drives the claw portion towards the ratchet;

wherein the elastic teeth are made of an elastic material; when the claw portion of the claw is buckled on the elastic teeth by the force of the tension spring, the ratchet is flexibly fixed; when an external driving force applied on the ratchet is large enough to deform the elastic teeth, sliding tooth happens.

Preferably, the ratchet is integrated, or adopts a multilayer structure comprising a wheel hub and an elastic gear ring sleeved on the wheel hub.

The present invention also provides a stop transmission mechanism for a toner cartridge, comprising:

a ratchet provided on one end of a stirring rod, wherein elastic teeth are provided on a periphery of the ratchet, and a convex block is convexly provided at an external side of the ratchet;

a claw provided at a radical side of the ratchet, comprising a fixed end and a moving end which rotates around the fixed end, wherein a claw portion to be engaged with the elastic teeth is provided on the moving end, and an external side of the claw portion extends to place a stop plate; and a tension spring, wherein one end of the tension spring is fixed, and the other end of the tension spring is mounted on the moving end of the claw, for providing a force which drives the claw portion towards the ratchet.

As described in the first paragraph of the BACKGROUND, the stop transmission mechanism of the present invention is mainly for internal fixing of the toner cartridge in the second fixing step, wherein when the toner cartridge is driven to rotate to a working position, the toner cartridge is stopped while an external driving force from an imaging equipment continues; when the external driving force applied on the ratchet is large enough to deform the elastic teeth, sliding tooth happens until the convex block rotates with the ratchet and contacts with the stop plate, wherein after the claw is lifted and detached from the elastic teeth, flexible fixing between the claw portion and the elastic teeth is removed, in such a manner that the toner cartridge turns into a working state, and the ratchet rotates normally.

Preferably, the ratchet is integrated, or adopts a multi-layer structure comprising a wheel hub and an elastic gear ring sleeved on the wheel hub.

Preferably, the claw comprises:
a first plate portion having the stop plate;
a second plate portion in a same plane of the first plate, wherein the second plate portion has a curved portion fitting a tooth back of the elastic teeth, and the claw portion is extended from the curved portion; and
an installing portion having claw installing holes;
wherein the first plate portion and the second plate portion are respectively provided at two sides of a first end face.

Preferably, the first plate portion comprises an outer end face departing from the ratchet, and an inner end face connecting the second plate portion; a smooth face is formed between the outer end face and the inner end face, and the smooth face forms a certain acute angle with a plane of the first end face.

The present invention also provides a toner cartridge, comprising:
a cylinder, wherein a toner outlet is provided on a periphery wall of the cylinder; a front end cap and a rear end cap are respectively provided at two ends of the cylinder;
a sliding cap, wherein an internal wall of the sliding cap fits the cylinder and relatively rotates around an axis of the cylinder;
a stirring rod provided inside the cylinder;
a stirring rod gear mounted at an end of the stirring rod which is near the front end cap;
a carrier gear mounted on the front end cap and engaged with the stirring rod gear; and
a stop transmission mechanism comprising: a ratchet, wherein elastic teeth are provided on a periphery of the ratchet, and a convex block is convexly provided at an external side of the ratchet; a claw provided at a radical side of the ratchet, comprising a fixed end and a moving end which rotates around the fixed end, wherein a claw portion to be engaged with the elastic teeth is provided on the moving end, and an external side of the claw portion extends to place a stop plate; and a tension spring, wherein one end of the tension spring is fixed, and the other end of the tension spring is mounted on the moving end of the claw, for providing a force which drives the claw portion towards the ratchet; wherein the ratchet is fixed at a rear end of the stirring rod, the tension spring and the fixed end of the claw are mounted on the rear end cap.

Preferably, the ratchet is integrated, or adopts a multi-layer structure comprising a wheel hub and an elastic gear ring sleeved on the wheel hub.

Preferably, the toner cartridge further comprises a handle which is connected to the rear end cap in a collapsible form.

Preferably, a pressure lever is vertically extended from a face of the handle which faces the cylinder; an end of the pressure lever which is near the cylinder is radically convex for forming a hock portion; the hock portion has a sliding face which fits a smooth face of the claw.

Preferably, the toner cartridge further comprises:
a stirring slice installed on the stirring rod;
a toner outlet sponge installed at the toner outlet;
a seal pasted on the toner outlet sponge;
a toner filling inlet provided on the rear end cap, wherein a soft cap is installed on the toner filling inlet;
oil seals respectively provided at a connection portion between the stirring rod and the front end cap, and a connection portion between the stirring rod and the rear end cap; and
a label pasted on the sliding cap.

Compared with conventional technologies, beneficial effects of the present invention are as follows.

1. According to the stop transmission mechanism of the present invention, teeth of the ratchet are the elastic teeth made of the elastic material. The elastic teeth can be deformed under a certain force and can be restored when the force is removed. When the ratchet is not driven, the tension spring forces the claw to be engaged with the elastic teeth, and the claw prevents the ratchet from rotating. Then the cylinder is driven by the equipment to rotate relative to the sliding cap by a certain angle, in such a manner that the toner outlet of the toner cartridge aims at a toner inlet of the equipment. At this moment, the cylinder can no longer be rotated while the equipment will continue to drive. When the ratchet is driven, the elastic teeth are deformed due to brake of the claw. After the claw is detached from an elastic tooth, the claw will be engaged with a next elastic tooth under an action of the tension spring. As the ratchet rotates continuously, when the convex block provided on the ratchet is brought into contact with the stop plate provided on the claw, the convex block pushes the claw over a stop point, so that the claw is no longer in contact with the elastic teeth, and the ratchet begins to normally rotate with the stirring rod.

2. According to the stop transmission mechanism of the present invention, the claw cooperates with the elastic teeth to realize stop and transmission. Compared with conventional structures adopting a restriction boss and a slider, which has a mess of small parts, a complex structure, and inconvenient processing, installation as well as maintenance, the present invention has a simple structure and convenient installation, so as to simply processing, installation and maintenance of the toner cartridge. Compared with conventional structures adopting a rubber ring for stopping a stirring frame gear by generating a friction, the present invention does not need to use a friction-increasing part, which reduces damage to the parts of the imaging equipment.

3. Generally, a stop transmission mechanism of conventional toner cartridges is provided at a front end cap of a driving wheel of the imaging equipment together with a carrier gear and a stirring rod gear. With a lot of parts arranged in the front end cap, processing and installing accuracies of the parts are highly required, otherwise the parts are easy to be stuck, leading to damage of a driver. The present invention provides the stop transmission mechanism at the rear end cap which is away from the driving wheel, thereby further simplifying processing, installation and maintenance.

4. The pressure lever is provided on the handle and the end portion of the pressure lever is hooked. When the claw needs to return to the initial position, if the handle is folded, the handle should be opened outwards, in such a manner that the sliding face of the pressure lever on the handle applies a downward force to the claw for pushing back the claw to be engaged with the elastic teeth; if the handle is in an open position, the handle is pressed inwards and the pressure lever will be in contact with the claw for restoring the claw, which is very convenient.

BRIEF DESCRIPTION OF THE DRAWINGS

In order to more clearly illustrate the embodiments of the present invention or the technical solutions in the prior art, the drawings used in the description of the embodiments or the prior art will be briefly described below. It will be apparent that the drawings described below are merely exemplary to the present invention and that, for those of ordinary skills in the art, other structures may be obtained from the structures shown in these figures without making any creative work.

ELEMENT REFERENCE

Figure 1:
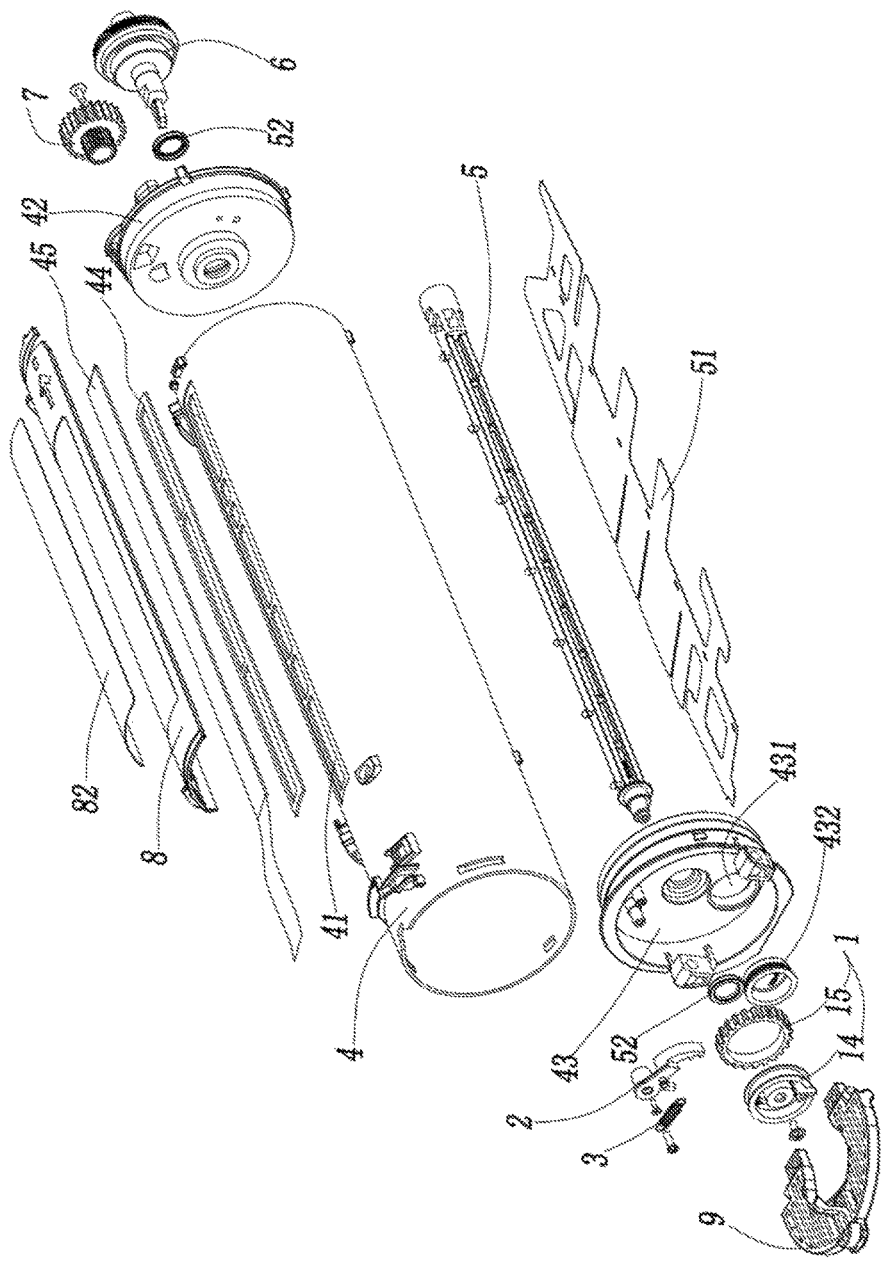
FIG. 1 is a structural exploded view of a toner cartridge according to an embodiment 2 of the present invention.
Figure 2:
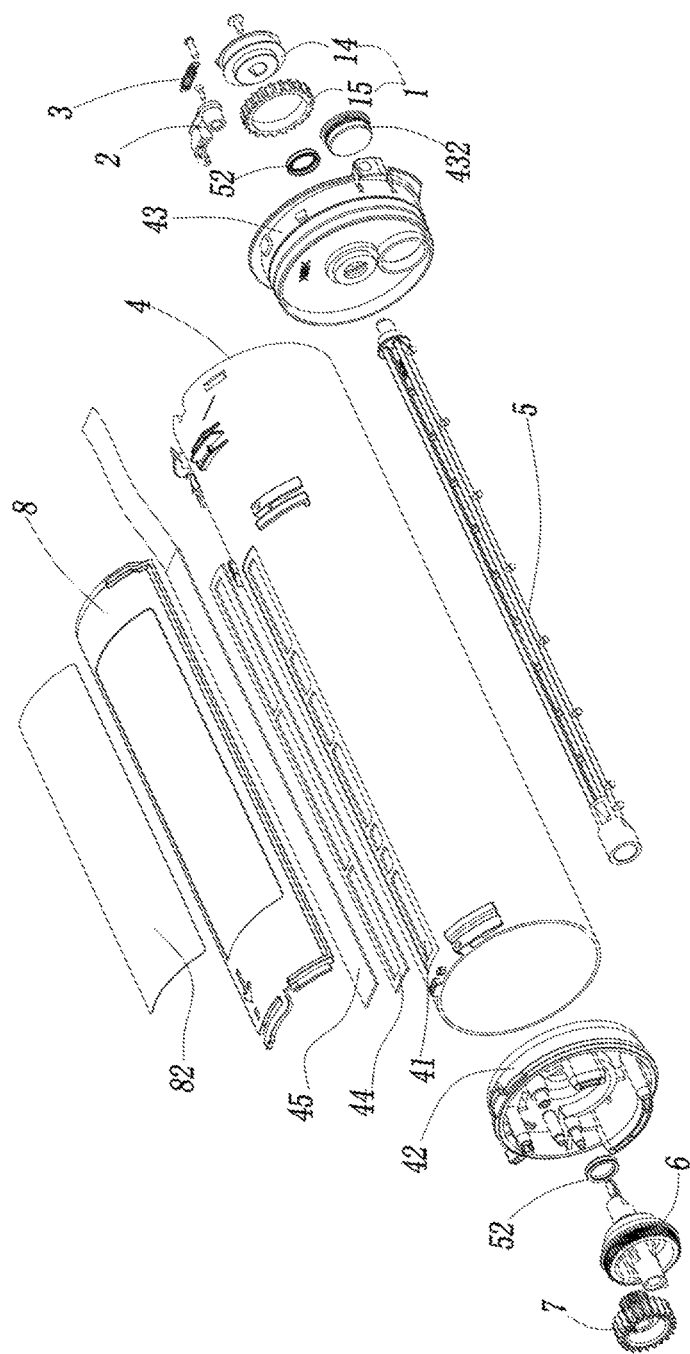
FIG. 2 is a structural exploded view of another view of the toner cartridge (omitting handle) in FIG. 1.
Figure 3:
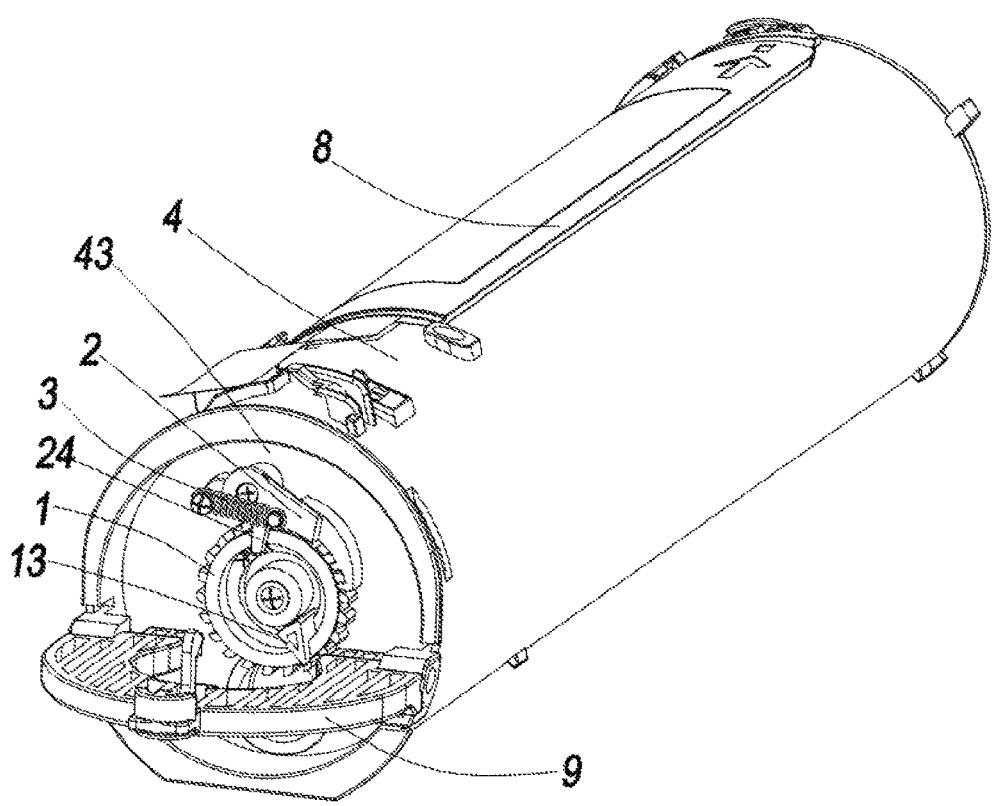
FIG. 3 is a view showing a configuration when the stop transmission mechanism of the toner cartridge shown in FIG. 1 is in a stop position.
Figure 4:
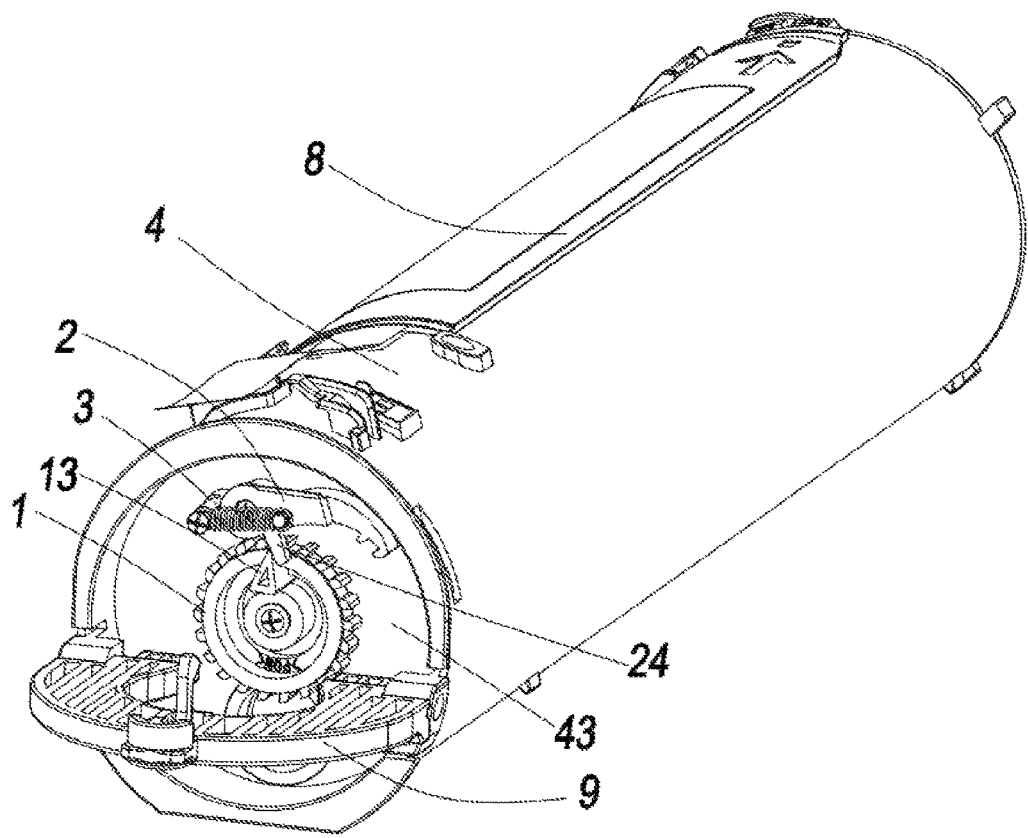
FIG. 4 is a view showing a structure when a claw is lifted in the stop transmission mechanism of the toner cartridge shown in FIG. 1.
Figure 5:
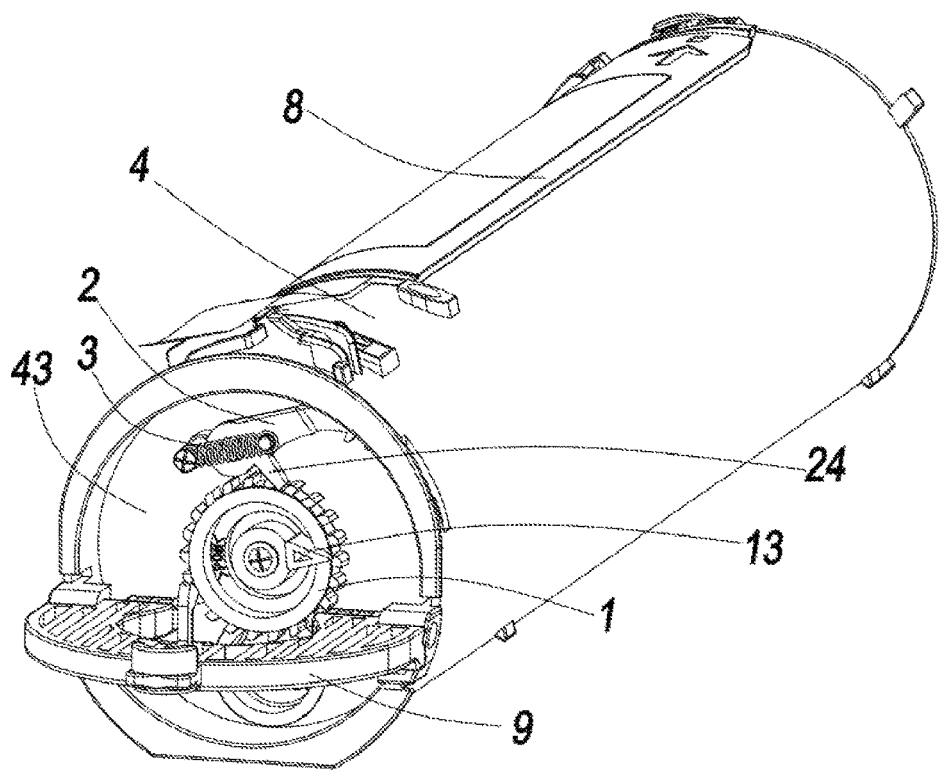
FIG. 5 is a view showing a structure when a stop plate is lifted in the stop transmission mechanism of the toner cartridge shown in FIG. 1.
Figure 6:
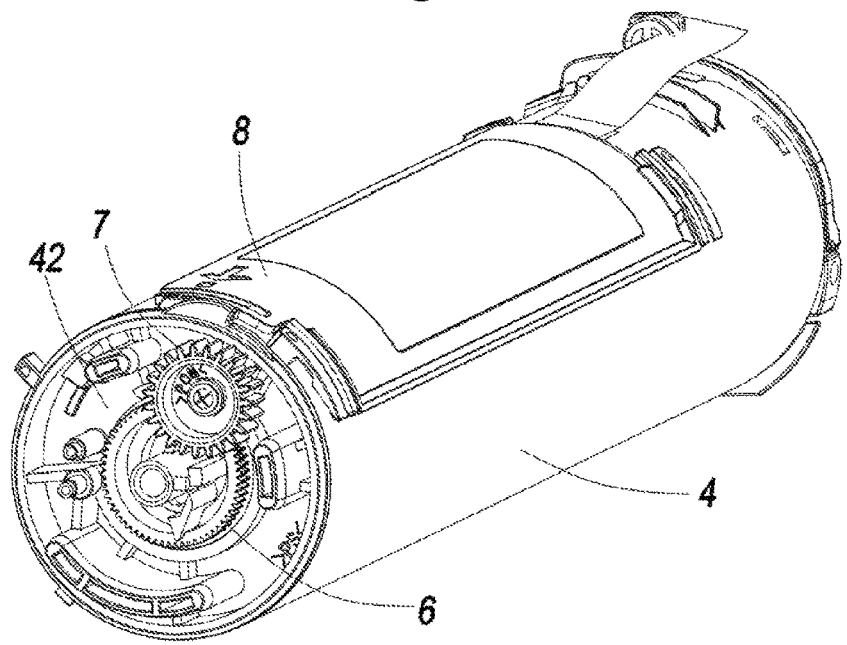
FIG. 6 is a structural view of the toner cartridge having a same angle of view as FIG. 2.

| number | name | number | name |
|---|---|---|---|
| 1 | Ratchet | 4 | Cylinder |
| 11 | Elastic teech | 41 | Toner outlet |
| 12 | First end face | 42 | Front end cap |
| 13 | Convex block | 43 | Rear end cap |
| 14 | Wheel hub | 44 | Toner end sponge |
| 15 | Elastic gear ring | 45 | Seal |
| 2 | Claw | 431 | toner filling inlet |
| 21 | Fixed end | 432 | Soft cap |
| 22 | Moving end | 5 | Stirring rod |
| 23 | Claw portion | 6 | Stirring rod gear |
| 24 | Stop plate | 7 | Carrier gear |
| 25 | First plate portion | 8 | Sliding cap |
| 26 | Second plate portion | 81 | Buckle |
| 251 | Outer end face | 82 | Label |
| 252 | Inner end face | 9 | Handle |
| 253 | Smooth face | 91 | Pressure lever |
| 261 | Curved portion | 92 | Hock poriton |
| 3 | Tension spring | 93 | Sliding face |

Objectives, features, and advantages of the present invention will become apparent from the following detailed description and the accompanying drawings.

DETAILED DESCRIPTION OF THE PREFERRED EMBODIMENT

The embodiments of the present invention will now be described in conjunction with the accompanying drawings, and it will be apparent that the described embodiments are merely part of the present invention and are not intended to be exhaustive. All other embodiments obtained by those of ordinary skill in the art without making creative work are within the scope of the present invention, based on embodiments of the invention.

It should be noted that all directional indications (such as upper, lower, left, right, front, rear . . . ) in the embodiments of the present invention are only used to explain the relationships such as relative positional relationship and movement between the components in a particular posture (as shown in the drawings). And if the particular gesture changes, the directional indication changes accordingly.

In addition, the description of "first", "second" and the like in the present invention is for illustrative purposes only and is not to be construed as indicating or implying its relative importance or implied indication of the number of technical features indicated. Thus, a feature that defines a "first" or a "second" may expressly or implicitly include at least one of the features. In the description of the present invention, the meaning of "plural" is at least two, such as two, three, etc., unless otherwise specifically defined.

In the present invention, unless otherwise expressly defined and restricted, the terms "connected", "fixed", etc., should be broadly understood, for example, "fixed" may be a fixed connection, or may be detachably connected or integral; or either a mechanical connection or an electrical connection; it can be directly connected or indirectly connected by an intermediate medium, or either an interconnection of two elements or an interaction between two elements unless otherwise explicitly defined. The specific meaning of the above-mentioned terms in the present invention can be understood by those skilled in the art in light of specific circumstances.

In addition, the technical solutions between the various embodiments of the present invention may be combined with each other, but must be based on the ability of one of ordinary skill in the art to be realized, and when the combination of technical solutions is contradictory or unachievable, it should be considered that this combination of technical solutions does not exist, nor is it within the scope of protection required by the present invention.

Embodiment 1

The embodiment 1 of the present invention provides a stop transmission mechanism.

Referring to FIGS. 8-14, the stop transmission mechanism comprises:
a ratchet 1, wherein elastic teeth 11 are provided on a periphery of the ratchet 1;
a claw 2 provided at a radical side of the ratchet 1, comprising a fixed end 21 and a moving end 22 which rotates around the fixed end 21, wherein a claw portion 23 to be engaged with the elastic teeth 11 is provided on the moving end 22; and
a tension spring 3, wherein one end of the tension spring 3 is fixed, and the other end of the tension spring 3 is mounted on the moving end 22 of the claw 2, for providing a force which drives the claw portion 23 towards the ratchet 1;
wherein the elastic teeth 11 are made of an elastic material; when the claw portion 23 of the claw 2 is buckled on the elastic teeth 11 by the force of the tension spring 3, the ratchet 1 is flexibly fixed; when an external driving force applied on the ratchet 1 is large enough to deform the elastic teeth 11, sliding tooth happens.

Figure 9:
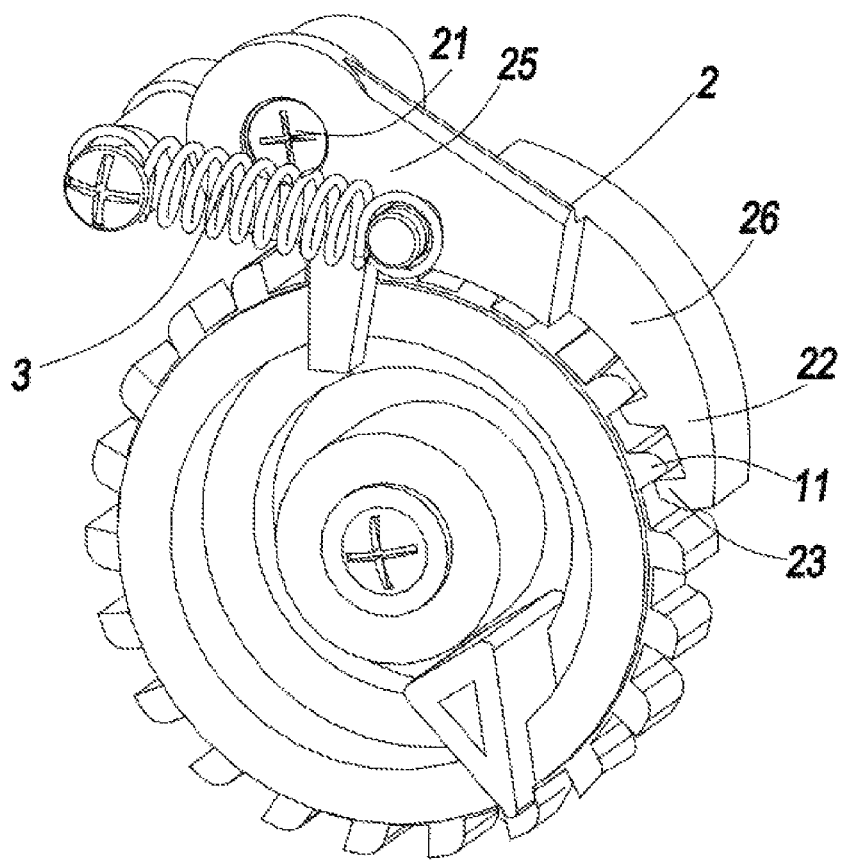
FIG. 9 is a view showing a configuration in which elastic teeth are deformed in the stop transmission mechanism.
Figure 10:
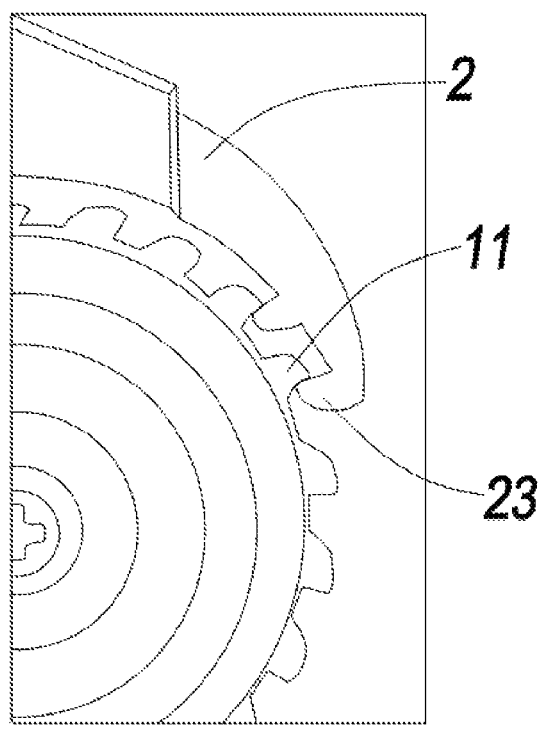
FIG. 10 is a front partial view of FIG. 9.

In the stop transmission mechanism, the elastic teeth 11 are made of the elastic material, which are required to have sufficient elasticity and high strength, so as to be curved and deformed by a tangential force which is opposite to a rotation direction of the ratchet 1. Preferably, the elastic teeth 11 are made of a PU material with high mechanical properties, wherein the PU material is not only good at elasticity and wear resistance, but also at breaking elongation and tear strength. Furthermore, a hardness of the elastic teeth 11 is 75±5 A, preferably 75 A. When a torsion tested with a torsiometer is 68N±5N/CM, the elastic teeth 11 are deformed. Referring to FIGS. 9 and 10, the elastic teeth are originally oblique teeth tilted in the rotation direction, and the claw portion 23 of the claw 2 is provided between adjacent elastic teeth 11. After the ratchet 1 rotates, a face of the elastic teeth 11 contacting with the claw portion 23 is squeezed by the claw 2, so as to be deformed. With relative movement between the ratchet 1 and the claw 2, when the claw 2 is detached from an elastic tooth 11, the elastic teeth 11 is restored, and the claw 2 will be engaged with a next elastic tooth 11.

The claw 2 and the tension spring 3 are arranged at a same side of the ratchet 1. The tension spring 3 forces the claw 2 to be engaged with the elastic teeth 11, and the claw 2 flexibly fixes the ratchet 1, which means the claw 2 contacts with the elastic teeth 11 for being engaged with the ratchet 1. When the elastic teeth 1 are deformed, the ratchet 1 continues to rotate. When the ratchet 1 rotates in a first direction M, the elastic teeth 11 are deformed in a direction opposite to the first direction M due to contact with the claw 2 while the claw 2 is oppositely driven by the elastic teeth 11. A convex block 13 on the ratchet 1 is able to rotate to contact with a stop plate 24 of the claw 2 with rotation of the ratchet 1, and lift the claw 2. When the claw 2 is lifted over a stop point, namely a gyroscopic moment applied on the claw 2 by the tension spring 3 is zero, the tension spring 3 cannot pull the claw 2 to rotate towards the ratchet, so the claw 2 stands still.

Figure 8:
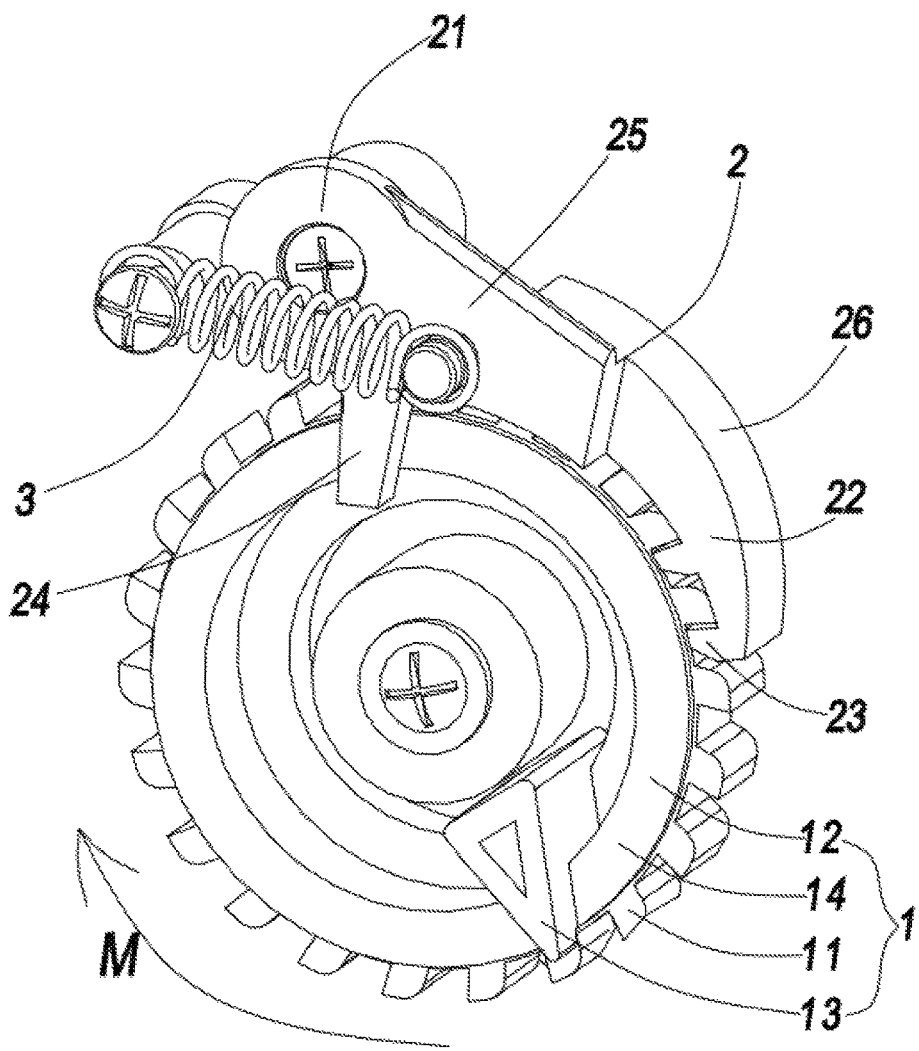
FIG. 8 is an enlarged view of a structure when the stop transmission mechanism of FIG. 3 is in a stop position.
Figure 11:
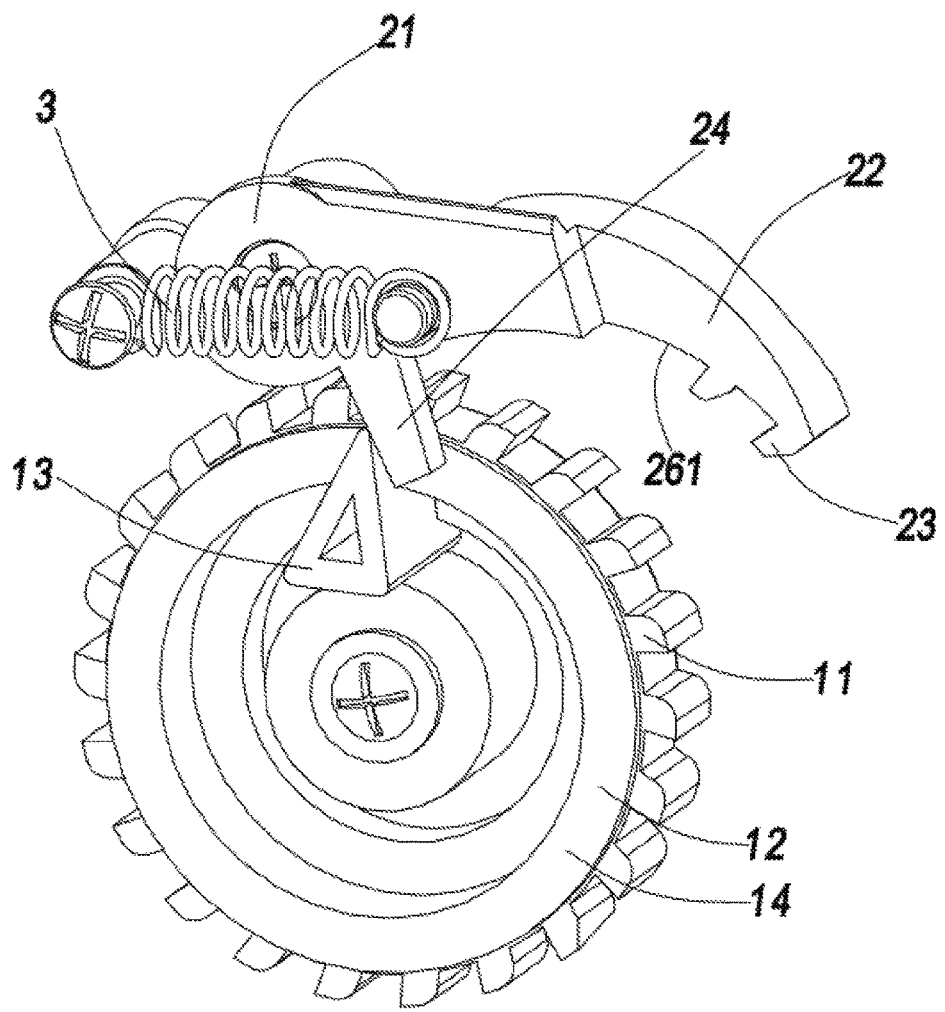
FIG. 11 is an enlarged view of a structure when the claw is lifted in the stop transmission mechanism of FIG. 4.
Figure 12:
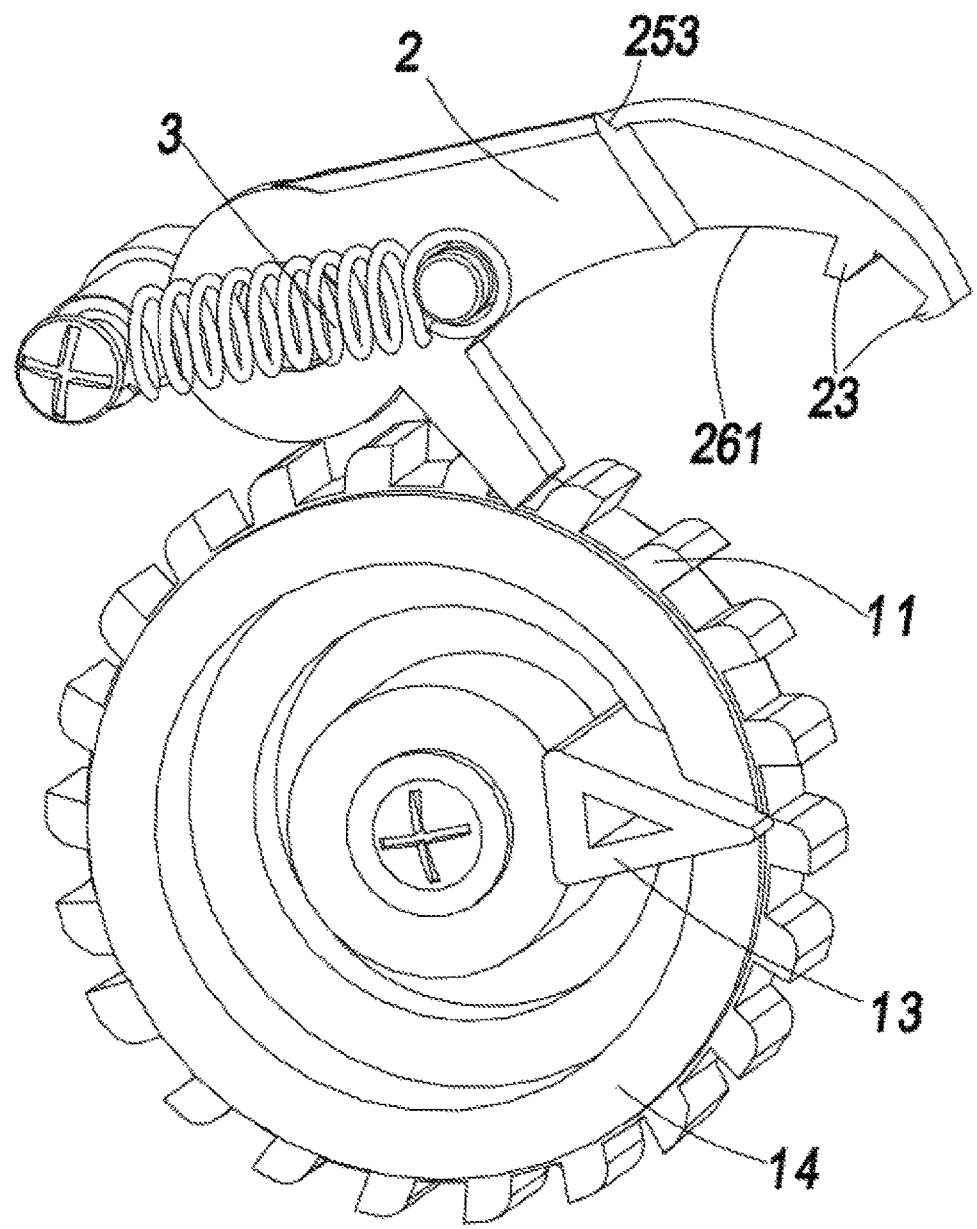
FIG. 12 is an enlarged view of a structure when the stop plate is lifted in the stop transmission mechanism of FIG. 5.
Figure 13:
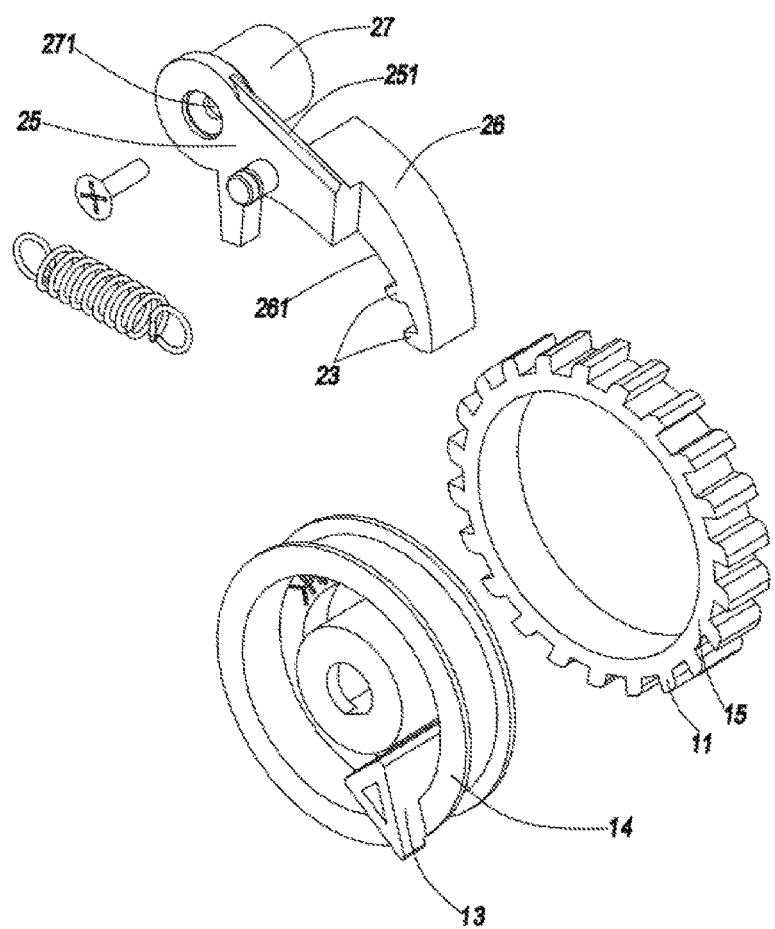
FIG. 13 is an exploded view of FIG. 7.

Moreover, when the stop transmission mechanism is used for a toner cartridge, the ratchet 1 is mounted on a stirring rod 5 which is driven in the first direction M as shown in FIG. 8. In a non-working state, the claw 2 is pulled by the tension spring 3, in such a manner that the claw portion 23 is engaged with the elastic teeth 11, the claw 2 locks the ratchet 1, and the ratchet 1 cannot rotate, thereby locking the stirring rod 5 for realizing stop. Referring to FIGS. 9 and 10, when the other end of the stirring rod 5 continues to be driven, the elastic teeth 11 are forced to be deformed. At this moment, the elastic teeth 11 are not completely detached from the claw 2, and the claw 2 is oppositely driven and oppositely rotates the toner cartridge by a certain angle. Referring to FIGS. 11 and 12, after the convex block 13 on the ratchet 1 clockwise rotates to contact with the stop plate 24 of the claw 2 and lifts the claw 2 over the stop point with rotation of the ratchet 1, the claw 2 unlocks the ratchet 1 and the ratchet 1 rotates normally, wherein the claw 2 has been lifted over the stop point and will not be pulled towards the ratchet 1, so the ratchet rotates normally for transmission.

As can be seen from the above, the stop transmission mechanism of the present invention adopts the elastic teeth 11 which cooperate with the claw 2 for locking and unlocking the ratchet 1. For locking, only the tension spring 3 should be pulled to provide a gyroscopic force, and the gyroscopic force can be removed by the convex block 13 on the ratchet 1 after unlocking. Therefore, only a small amount of parts is needed, a structure is simple, and processing, installation and maintenance are convenience. Furthermore, since the elastic teeth 11 are elastic, the elastic teeth 11 are engaged with the claw 2 while being deformed with rotation of the ratchet 1, and the elastic teeth 11 are retracted by the claw 2. When being stopped, the elastic teeth 11 is elastically deformed, so the claw 2 is capable of braking rotation of the ratchet while oppositely rotating the toner cartridge by a certain angle, for rotating the toner cartridge to the working position. When the external force is removed, the elastic teeth 11 can be restored to an original state. Stop and transmission are very smooth.

Preferably, the ratchet 1 is integrated, or adopts a multi-layer structure comprising a wheel hub 14 and an elastic gear ring 15 sleeved on the wheel hub 14.

The convex block 13 is provided on the wheel hub 14, and the wheel hub 14 is relatively mounted on the elastic gear ring 15, wherein the elastic teeth 11 are arranged on the elastic gear ring 15.

Preferably, the claw 2 comprises:
a first plate portion 25 having the stop plate 24;
a second plate portion 26 in a same plane of the first plate, wherein the second plate portion 26 has a curved portion 261 fitting a tooth back of the elastic teeth 11, and the claw portion 23 is extended from the curved portion 261; and
an installing portion 27 having claw installing holes 271;
wherein the first plate portion 25 and the second plate portion 26 are respectively provided at two sides of a first end face 12.

The claw installing holes 271 are used for mounting the fixed end 21 with bolts, and enabling the moving end 22 to rotate around the fixed end 21. The first plate portion 25 and the second plate portion 26 are respectively provided at two sides of a plane where the first end face 12 is. When the second plate portion 26 cooperates with the ratchet 1 and the stop plate 24 on the first plate portion 25 contacts with the convex block 13 on the ratchet 1, the claw 2 does not disturb and contact with the convex block 13, and the stop plate 24 does not disturb and contact with the elastic teeth 11.

Figure 14:
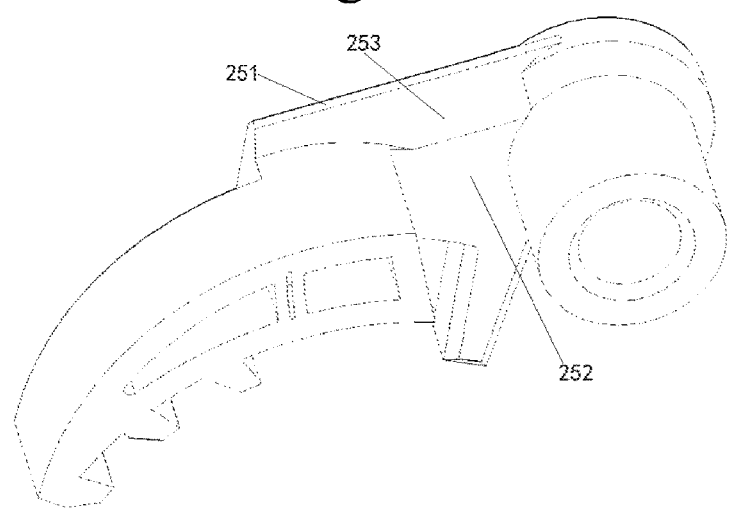
FIG. 14 is a rear view of the claw in the stop transmission mechanism according to an embodiment 1 of the present invention.

Preferably, referring to FIG. 14, the first plate portion 25 comprises an outer end face 251 departing from the ratchet 1, and an inner end face 252 connecting the second plate portion 26; a smooth face 253 is formed between the outer end face 251 and the inner end face 252, and the smooth face 253 forms a certain acute angle with a plane of the first end face 12.

Referring to FIG. 12, the claw 2 is placed at a position over the stop point in a direction away from the ratchet 1. When the ratchet 1 needs to be locked again, the claw 2 is pushed downwards to a position over the stop point in a direction facing the ratchet 1, in such a manner that the claw 2 is pulled by the tension spring 3 to be close to and engaged with the ratchet 1 again. Preferably, by pushing the smooth face 253 outwards along a parallel direction of an axis of the ratchet 1, the smooth face 253 automatically moves downwards, in such a manner that the claw 2 automatically rotates back to lock the ratchet 1.

Preferably, there are two claw portions 23, wherein the two claw portions 23 provide a better stop breaking effect. Unlimitedly, the elastic teeth 11 may be straight teeth or oblique teeth. Rubber has high elasticity and deformation quantity under the room temperature, which ensures that the elastic teeth 11 can be deformed under a certain force for unlocking, wherein deformation is restorable, which ensures that the ratchet 1 is able to lock for the next time.

Embodiment 2

The embodiment 2 provides a toner cartridge.

For convenience, an end of the toner cartridge where a handle 9 is located is defined as a rear end, and the other end is defined as a front end.

Referring to FIGS. 1-19, the toner cartridge comprises:

a cylinder 4, wherein a toner outlet 41 is provided on a periphery wall of the cylinder 4; a front end cap 42 and a rear end cap 43 are respectively provided at two ends of the cylinder 4;

a sliding cap 8, wherein an internal wall of the sliding cap 8 fits the cylinder 4 and relatively rotates around an axis of the cylinder 4;

a stirring rod 5 provided inside the cylinder 4;

a stirring rod gear 6 mounted at an end of the stirring rod 5 which is near the front end cap 42;

a carrier gear 7 mounted on the front end cap 42 and engaged with the stirring rod gear 6; and a stop transmission mechanism as recited in the embodiment 1, wherein the ratchet 1 is fixed at a rear end of the stirring rod 5, a tension spring 3 and a fixed end 21 of a claw 2 are mounted on the rear end cap 43.

Figure 15:
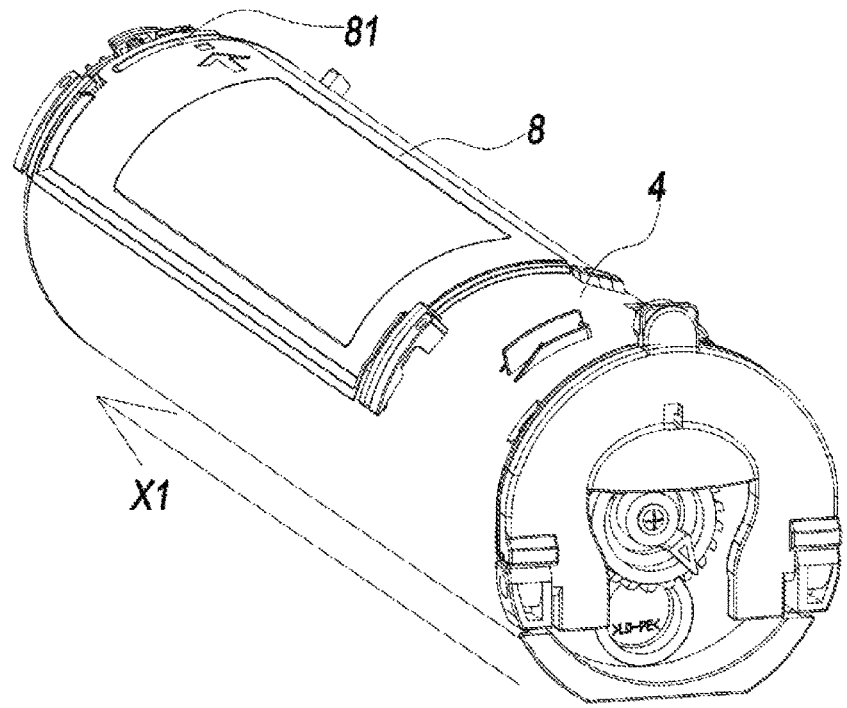
FIG. 15 is a view showing a structure of a cylinder in the toner cartridge shown in FIG. 1 at an initial position.
Figure 16:
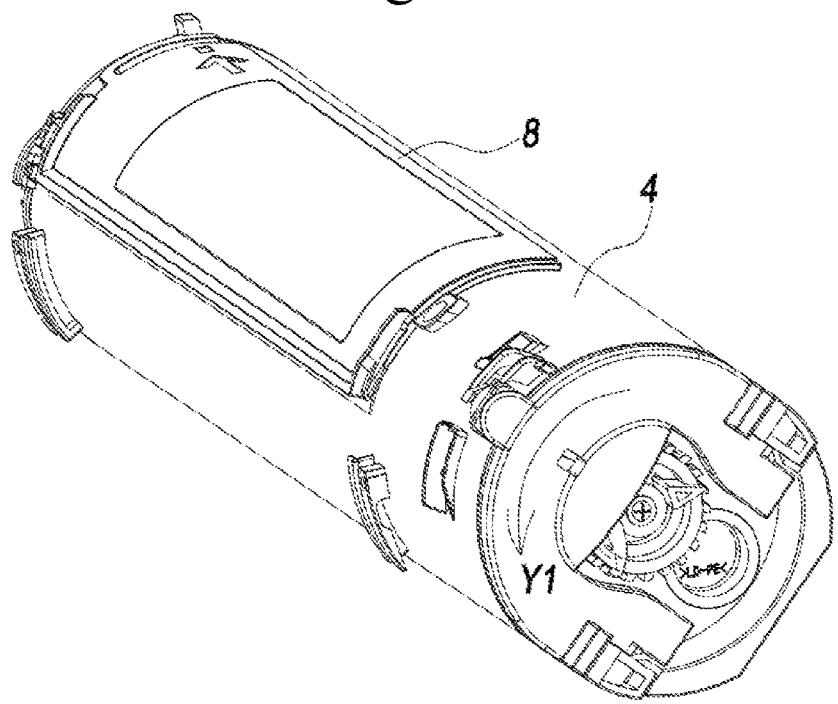
FIG. 16 is a view showing a structure of the cylinder in the toner cartridge shown in FIG. 1 at a predetermined position.
Figure 17:
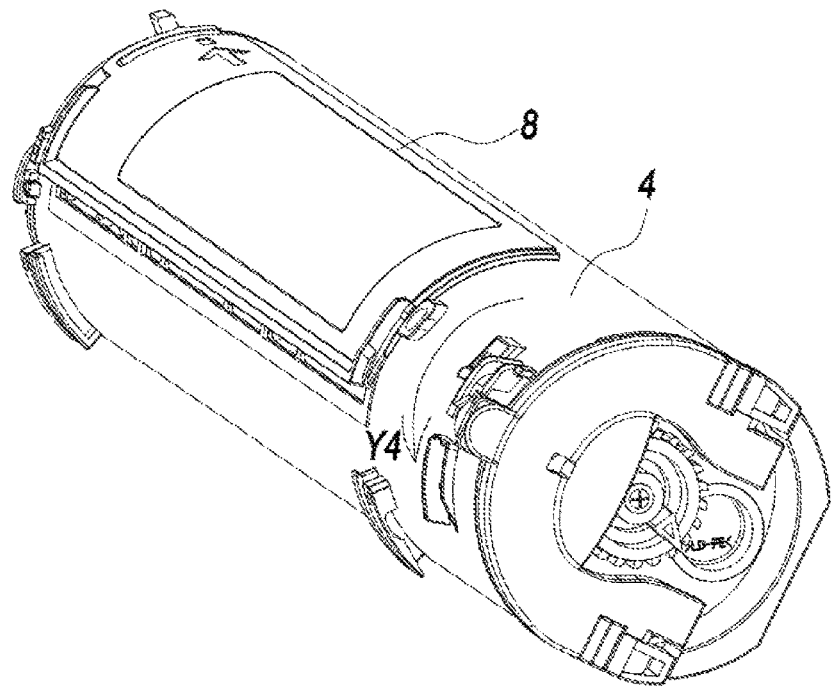
FIG. 17 is a structural view of the toner cartridge shown in FIG. 1 when a toner outlet is opened.
Figure 18:
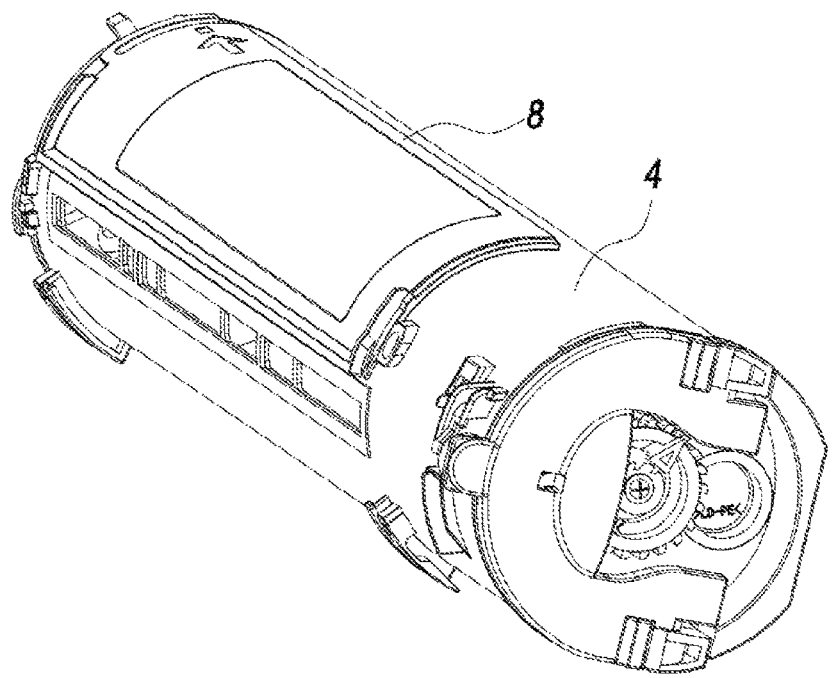
FIG. 18 is a structural view of the toner cartridge shown in FIG. 1 when the toner outlet is fully opened.
Figure 19:
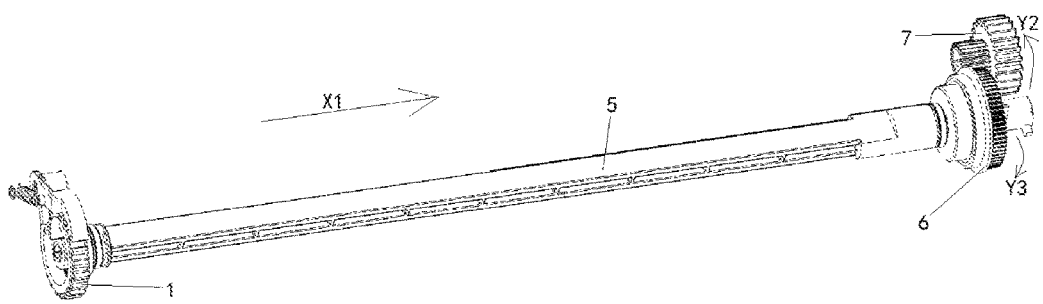
FIG. 19 is a view showing a connection structure of a stirring rod, stirring rod gear, a carrier gear and a ratchet in the toner cartridge shown in FIG. 1

Referring to FIGS. 15-19, a working method of the toner cartridge comprises steps of:

S1, referring to FIG. 15, firstly inserting the toner cartridge into an initial position in a developer unit of an imaging equipment along a direction X1 as shown in FIG. 15, wherein a buckle 81 on the sliding cap 8 drops into a buckling position of the developer unit, which prevents the sliding cap 8 from moving; meanwhile, the toner outlet 41 is covered by the sliding cap 8;

S2, referring to FIG. 16, rotating the cylinder 4 along a direction Y1, in such a manner that the cylinder 4 rotates to a predetermined position relative to the sliding cap 8; and engaging the carrier gear 7 on the front end cap 42 with a driving gear on the imaging equipment;

S3, referring to FIGS. 17 and 19, turning on the imaging equipment, so as to rotate the carrier gear 7 along a direction Y2 by the driving gear of the imaging equipment; rotating the stirring rod gear 6 engaged with the carrier gear 7 along a direction Y3, so as to drive the stirring rod 5 and the ratchet 1 in sequence to also rotate along the direction Y3; wherein because the claw 2 is engaged with the elastic teeth 11 on the ratchet 1 and prevents the ratchet 1 from rotating while the carrier gear 7 is still engaged with the driving gear of the imaging equipment, a driving force of the imaging equipment is converted into a force which rotates the cylinder 4 along a direction Y4; as a result, the cylinder 4 further rotates relative to the sliding cap 8 by a certain angle, in such a manner that the toner outlet 41 on the cylinder 4 communicates with a toner inlet on the developer unit of the imaging equipment; and S4, referring to FIG. 18, opening a shutter structure in the developer unit of the imaging equipment when the toner outlet 41 of the cylinder 4 fully aims at the toner inlet on the developer unit of the imaging equipment, wherein the toner cartridge is at the working position and cannot be further rotated, while the imaging equipment continues to drive the carrier gear 7 for driving the stirring rod 5 and the ratchet 1 in sequence; when sliding tooth happens to the elastic teeth 11 on the ratchet 1 due to deformation caused by the claw 2 while the convex block 13 on the ratchet 1 rotates to lift the stop plate 24, the claw 2 is detached from the ratchet 1; therefore, after the ratchet 1 is unlocked, the carrier gear 7 and the stirring rod gear 6 are driven by the driving gear of the imaging equipment to rotate normally, and the toner outlet 41 of the cylinder 4 continuously feeds the imaging equipment with toner.

The toner cartridge of the present invention adopts the stop transmission mechanism as described in the embodiment 1. First, the elastic teeth 11 are made of the elastic material, so as to be elastically deformed with a braking effect of the claw 2 when the ratchet 1 is driven, and oppositely drive the toner cartridge to rotate to the working position for feeding the toner. Second, the ratchet 1 is mounted on the stirring rod 5 by bolts, and the claw 2 as well as the tension spring 3 are mounted on the rear end cap 43 by bolts, which provides a simple installation structure with convenient processing, installation and maintenance. Furthermore, the elastic teeth 11, whose deformation is restorable, are used for stopping when adjusting a feeding position of the toner cartridge, and for unlocking when the toner cartridge enters the working position, in such a manner that the stirring rod gear 6 rotates normally for rotating the stirring rod 5 to work, which effectively and smoothly brakes rotation, restricts position and restores. Third, generally, a stop transmission mechanism of conventional toner cartridges is provided at a front end cap of a driving wheel of the imaging equipment together with a carrier gear and a stirring rod gear. With a lot of parts arranged in the front end cap, processing and installing accuracies of the parts are highly required, otherwise the parts are easy to be stuck, leading to damage of a driver. The present invention provides the stop transmission mechanism at the rear end cap with is away from the driving wheel, so as to further simply processing, installation and maintenance. Fourth, if the toner cartridge is detached and will be installed again for working, the elastic teeth 11 of the present invention can be automatically restored. Moreover, the stop transmission mechanism of the present invention is provided on the rear end cap which is near the handle 9 of the cylinder 4. With slightly pushing, the claw 2 is able to automatically rotate back to be engaged with the ratchet 1 again, which is conducive to utilization.

Preferably, the toner cartridge further comprises the handle 9 which is connected to the rear end cap 43 in a collapsible form.

In the step S2, the handle 9 is conducive to rotating the cylinder 4; and in the step S3, the handle 9 is folded before turning on the imaging equipment.

Figure 7:
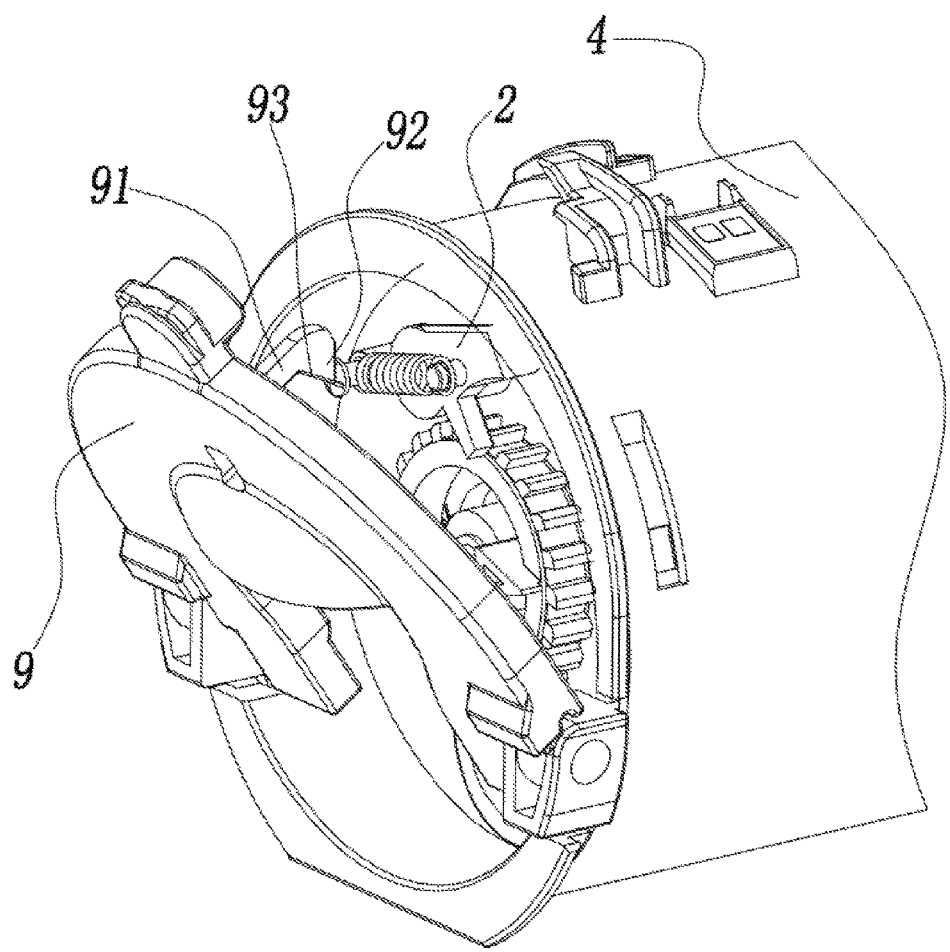
FIG. 7 is a partial view showing a structure of a handle of the toner cartridge shown in FIG. 1 in a half-open state.

Preferably, referring to FIG. 7, a pressure lever 91 is vertically extended from a face of the handle 9 which faces the cylinder 4; an end of the pressure lever 91 which is near the cylinder 4 is radically convex for forming a hock portion 92; the hock portion 92 has a sliding face 93 which fits a smooth face 253 of the claw 2.

When the handle 9 is folded, the sliding face 93 thereof fits the smooth face 253 of the claw 2, wherein if the handle 9 is opened outwards, the sliding face 92 applies a downward force to the claw 2 for pushing the claw 2 over the stop point in a direction facing the ratchet 1 to move towards the ratchet 1 with a tension of the tension spring 3 and to be engaged with the ratchet 1. When the handle 9 is in an open position, during loading the cylinder 4 into the imaging equipment, the handle 9 is pressed inwards and the pressure lever 91 will be in contact with the claw 2 for moving the claw 2 towards the ratchet 1, which conducive to restoring the claw 2.

Preferably, the toner cartridge further comprises:

a stirring slice 51 installed on the stirring rod 5;

a toner outlet sponge 44 installed at the toner outlet 41;

a seal 45 pasted on the toner outlet sponge 44;

a toner filling inlet 431 provided on the rear end cap 43, wherein a soft cap 432 is installed on the toner filling inlet 431;

oil seals 52 respectively provided at a connection portion between the stirring rod 5 and the front end cap 42, and a connection portion between the stirring rod 5 and the rear end cap 43; and a label 82 pasted on the sliding cap 8;

wherein the stirring slice 51 is used for stirring the toner in the toner cartridge; the toner outlet sponge 44 and the oil seals are all used for sealing the toner cartridge.

One skilled in the art will understand that the embodiments of the present invention as shown in the drawings and described above are exemplary only and not intended to be limited. It will thus be seen that the objects of the present invention have been fully and effectively accomplished. Its embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A stop transmission mechanism for a toner cartridge, comprising:

a ratchet provided on one end of a stirring rod, wherein elastic teeth are provided on a periphery of the ratchet, and a convex block is convexly provided at an external side of the ratchet;

a claw provided at a radical side of the ratchet, comprising a fixed end and a moving end which rotates around the fixed end, wherein a claw portion to be engaged with the elastic teeth is provided on the moving end, and an external side of the claw portion extends to place a stop plate; and a tension spring, wherein one end of the tension spring is fixed, and the other end of the tension spring is mounted on the moving end of the claw, for providing a force which drives the claw portion towards the ratchet;

wherein the elastic teeth are made of an elastic material; when the claw portion of the claw is buckled on the elastic teeth by the force of the tension spring, the ratchet is flexibly fixed; when the toner cartridge is driven to rotate to a working position, the toner cartridge is stopped while an external driving force continues; when the external driving force applied on the ratchet is large enough to deform the elastic teeth, sliding tooth happens until the convex block rotates with the ratchet and contacts with the stop plate, wherein after the claw is lifted and detached from the elastic teeth, the toner cartridge turns into a working state, and the ratchet rotates normally.

2. The stop transmission mechanism, as recited in claim 1, wherein the ratchet is integrated, or adopts a multi-layer structure comprising a wheel hub and an elastic gear ring sleeved on the wheel hub.

3. The stop transmission mechanism, as recited in claim 1, wherein the claw comprises:

a first plate portion having the stop plate;

a second plate portion in a same plane of the first plate, wherein the second plate portion has a carved portion fitting a tooth back of the elastic teeth, and the claw portion is extended from the carved portion; and an installing portion having claw installing holes;

wherein the first plate portion and the second plate portion are respectively provided at two sides of a first end face.

4. The stop transmission mechanism, as recited in claim 1, wherein the first plate portion comprises an outer end face departing from the ratchet, and an inner end face connecting the second plate portion; a smooth face is formed between the outer end face and the inner end face, and the smooth face forms a certain acute angle with a plane of the first end face.

5. A toner cartridge, comprising:

a cylinder, wherein a toner outlet is provided on a periphery wall of the cylinder; a front end cap and a rear end cap are respectively provided at two ends of the cylinder;

a sliding cap, wherein an internal wall of the sliding cap fits the cylinder and relatively rotates around an axis of the cylinder;

a stirring rod provided inside the cylinder;

a stirring rod gear mounted at an end of the stirring rod which is near the front end cap;

a carrier gear mounted on the front end cap and engaged with the stirring rod gear; and a stop transmission mechanism comprising: a ratchet, wherein elastic teeth are provided on a periphery of the ratchet, and a convex block is convexly provided at an external side of the ratchet; a claw provided at a radical side of the ratchet, comprising a fixed end and a moving end which rotates around the fixed end, wherein a claw portion to be engaged with the elastic teeth is provided on the moving end, and an external side of the claw portion extends to place a stop plate; and a tension spring, wherein one end of the tension spring is fixed, and the other end of the tension spring is mounted on the moving end of the claw, for providing a force which drives the claw portion towards the ratchet; wherein the ratchet is fixed at a rear end of the stirring rod, the tension spring and the fixed end of the claw are mounted on the rear end cap.

6. The toner cartridge, as recited in claim 5, further comprising a handle which is connected to the rear end cap in a collapsible form.

7. The toner cartridge, as recited in claim 6, wherein a pressure lever is vertically extended from a face of the handle which faces the cylinder; an end of the pressure lever which is near the cylinder is radically convex for forming a hock portion; the hock portion has a sliding face which fits a smooth face of the claw.

8. The toner cartridge, as recited in claim 5, further comprising:
- a stirring slice installed on the stirring rod;
- a toner outlet sponge installed at the toner outlet;
- a seal pasted on the toner outlet sponge;
- a toner filling inlet provided on the rear end cap, wherein a soft cap is installed on the toner filling inlet;
- oil seals respectively provided at a connection portion between the stirring rod and the front end cap, and a connection portion between the stirring rod and the rear end cap; and
- a label pasted on the sliding cap.

\* \* \* \* \*